Aug. 12, 1969    E. I. RIVIN    3,460,786
ELASTIC VIBRATION-PROOF SUPPORT
Filed Oct. 4, 1967    2 Sheets-Sheet 1

Aug. 12, 1969  E. I. RIVIN  3,460,786
ELASTIC VIBRATION-PROOF SUPPORT
Filed Oct. 4, 1967  2 Sheets-Sheet 2

United States Patent Office 3,460,786
Patented Aug. 12, 1969

3,460,786
ELASTIC VIBRATION-PROOF SUPPORT
Evgeny Izrailevich Rivin, Ulitsa Vavilova 44, Korpus 4,
Kr. 61, Moscow, U.S.S.R.
Filed Oct. 4, 1967, Ser. No. 672,774
Int. Cl. E02d 27/44; A47j 45/02
U.S. Cl. 248—22                                    7 Claims

ABSTRACT OF THE DISCLOSURE

An elastic vibration-proof support which comprises an elastic shock absorbing member interposed between a base and a cover and forming a gap with a side wall of the cover, the elastic member having a groove formed therein, there being a gap-block of greater hardness than the elastic member removably inserted into the groove and/or gap to reduce the size thereof and increase the stiffness of the support.

---

The invention relates to elastic vibration-proof supports, for machines and instruments.

The known elastic vibration-proof supports comprise a cover and a base, with a shock-absorbing member made of an elastic material, e.g. rubber, positioned therebetween. Provided in the shock-absorbing member are grooves, with a gap left between said shock-absorbing member and a bead provided on the cover. The size and arrangement of both the grooves and the gap are so selected as to permit them to close due to the lateral deformation of the shock-absorbing member in case a compression load is applied.

Such supports feature nonlinear deformation characteristics and, in particular, the so-called equifrequent characteristics, when the rigidity of these supports is proportionate to the compression load applied.

The supports featuring the equifrequent characteristics have gained wide industrial application for melting metal-cutting machines, forging and stamping equipment etc., in view of the fact that machines of different types, weights and dimensions are mounted on similar elastic vibration-proof supports without any preliminary calculations.

However in case of accidental coincidence of the frequency of any dynamic force developing during the machine's operation with the natural vibration frequency of the machine mounted on elastic supports, it is necessary to remount the machine on elastic vibration-proof supports featuring other characteristics.

Additionally, a stiffening rib in the known support permits a constant ratio between the stiffness values in vertical and horizontal directions to be obtained which is close to the optimum value within a wide range of loads applied to the support in different horizontal directions. However, in case the machine mounted on an elastic support has units performing sharp reverse motion, the stiffness of the elastic support in the direction of reverse motion may turn out to be inadequate, which leads to impermissible rocking of the machine. To reduce rocking, it is necessary to increase the rigidity of the elastic support. Moreover, in a number of instances it is essential that the longtiudinal stiffness of said support be much greater than its transverse stiffness.

It is an object of the present invention to provide an elastic vibration-proof support whose longitudinal and transverse stiffness values can be varied under operational conditions.

Another object of the present invention is to provide an elastic vibration-proof suport of the same type which is distinguished by its high reliability in operation and convenience in use and which will not require complicated preliminary calculations of supporting resistances of the unit being mounted thereon.

According to the afore-mentioned and other objects, the invention consists in an elastic vibration-proof support, in which a shock-absorbing member made of an elastic material and placed between the base and the cover is provided with at least one groove therein and is separated from the side wall of the cover with a gap. Said groove and said gap are at least partially closed when the support is acted on by a compression load. Additionally, provision is made in at least one groove and/or gap of the support according to the invention, for a detachable gap block made of a material having a greater hardness than the material of the shock-absorbing member.

It is desirable to fashion the detachable gap block as a plate with at least one lug so shaped as to fit into the groove and/or the gap.

Following hereinbelow is a detailed description of an exemplary embodiment of the present invention, reference being had to the appended drawing, wherein.

Figure 1:
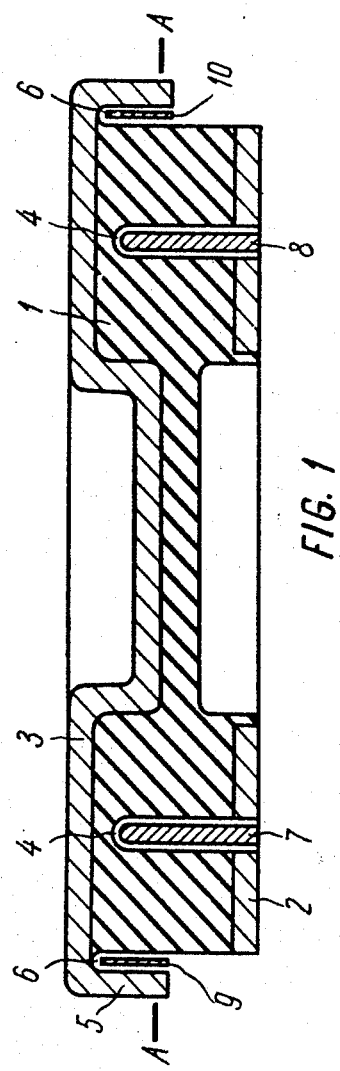
FIG. 1 shows a diametrical section of the elastic vibration-proof support of the invention, in which a detachable gap block is fashioned as separate plates.
Figure 2:
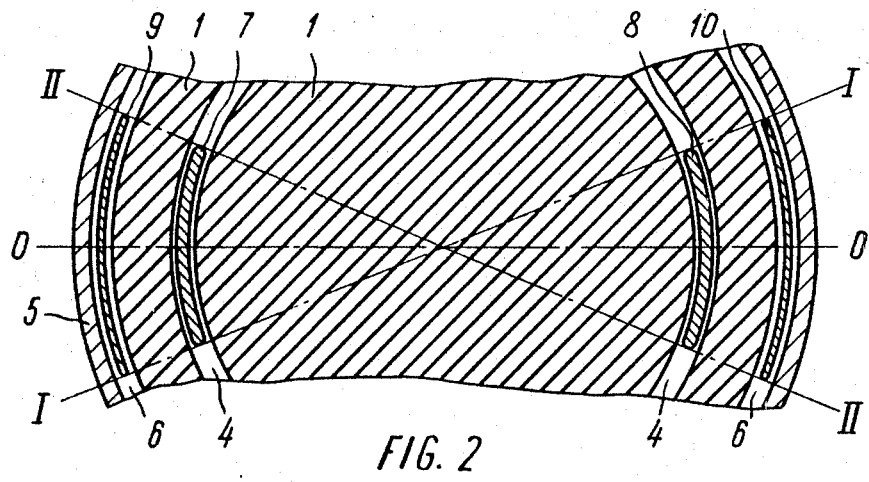
FIG. 2 is a section on line A—A of FIG. 1.

FIG. 1 shows an elastic vibration-proof support comprising a rubber shock-absorbing member 1 secured to a base 2 and a cover 3. Provided in the shock-absorbing member 1 are grooves 4. The cover 3 has a side wall 5, with a gap 6 between the inner surface of said side wall 5, and the outer surface of the shock-absorbing member 1. Inserted into some grooves 4 and the gap 6 is a detachable gap block consisting of a set of plates 7, 8, 9 and 10 made of a material whose hardness is greater than that of rubber and shaped so as to conform to the shape of the grooves and the gap (FIG. 2). The plates 9 and 10 are prevented from falling from gap 6 by means of an auxiliary device (not shown).

When a plate is inserted into some of the grooves 4 or the gap 6, the effective clearance of the corresponding groove or gap decreases.

In case of a lateral deformation caused by a compression load on the support, the rubber member is deformed to fill the space of a corresponding groove or gap into which the plate is inserted, the support deformation being smaller as a result of the presence of the gap block. Thus, the stiffness of the support in the direction of application of the load tends to increase, if a gap block is provided. The increase in the stiffness of the support depends upon the number of plates used and the area and thickness of the portion of each plate that fits into the groove or gap.

The provision of the gap block consisting of several separate plates in the grooves and gaps of the support results in an increased horizontal stiffness of said support, the more so in the direction perpendicular to the surface of a plate, e.g. along axis O—O of FIG. 2.

FIG. 1 shows an elastic vibration-proof support with a gap block consisting of the four separate plates 7, 8, 9 and 10. The support is cylindrical; the groove 4 and the gap 6 are annular-shaped and coaxial. The plates 7, 8, 9 and 10 making up the gap block are curved. The arrangement of these plates within a double setcor limited by the diameters I—I and II—II (FIG. 2) results in an increased stiffness, first, in a vertical direction (in the direction of the compression load), second, in the direction of the axis O—O, and, third, in a horizontal direction perpendicular to axis O—O.

The table following hereinbelow indicates the results of an experimental determination of the stiffness of the elastic vibration-proof support (FIG. 1), with or without the insertion of the gap block consisting of the plates 7, 8, 9 and 10. The thicknesses of the plates were adopted to be equal to the corresponding widths of the groove and the gap.

When using the elastic vibration-proof support (FIG. 1) with the gap block consisting of separate plates, the stiffness of the support in horizontal directions increases not much, as the load applied to the elastic vibration-proof support in a horizontal direction results in a shear strain of its shock-absorbing member, and the gap block consisting of separate unconnected plates offers no substantial resistance to this strain.

In fact, the plates constituting said gap block are turned in response to inclination of the corresponding side surfaces of the shock-absorbing member of the elastic vibration-proof support.

Figure 3:
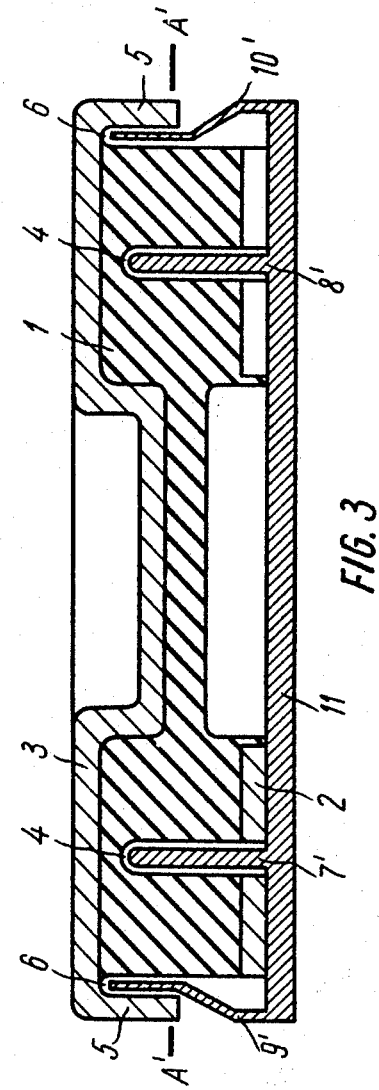
FIG. 3 is a diametrical section of the support of the invention, wherein the detachable gap block is fashioned as a plate with lugs.

In case a marked increase in the stiffness of the elastic vibration-proof support is required in a horizontal direction, the elastic vibration-proof support is fitted with a gap block, as shown in FIG. 3. In said support, the detachable gap block is fashioned as a plate 11 provided with lugs $7^1$, $8^1$, $9^1$ and $10^1$ made of a material whose hardness is greater than that of rubber e.g. steel and so shaped as to correspond to the shape of the grooves 4 and the gap 6.

As a result, the vertical stiffness increases substantially the same as in the case of the absence of the plate 11, whereas an increase in the horizontal stiffness is obtained which is notably largest. The horizontal stiffness increase is the largest in the direction perpendicular to the surface of the plates (i.e., in the direction of the axis $O^1-O^1$ of FIG. 4).

The above-given table sets forth the results of stiffness measurements of the vibration-proof support with a detachable gap block (FIGS. 3 and 4) as compared to that of the support without said gap block and with the support having the detachable gap block (FIGS. 1 and 2). It is clear from these data that if the plate 11 is provided, the stiffness of the elastic vibration-proof support in a vertical direction varies but slightly as compared to the elastic vibration-proof support provided with a detachable gap block, as shown in FIGS. 1 and 2, whereas the stiffness of the support in horizontal directions notably increases, especially in the direction of the axis O—O.

The elastic vibration-proof support according to the invention may also have a detachable gap block of different shape from that shown in FIGS. 1, 2, 3 and 4. For instance, the plates may fit into only some of the grooves; be positioned asymmetrically; be not as thick as required by the width of a corresponding groove or gap; and vary in area and shape, etc., which however does not depart in principle from the essence of the invention.

Figure 4:
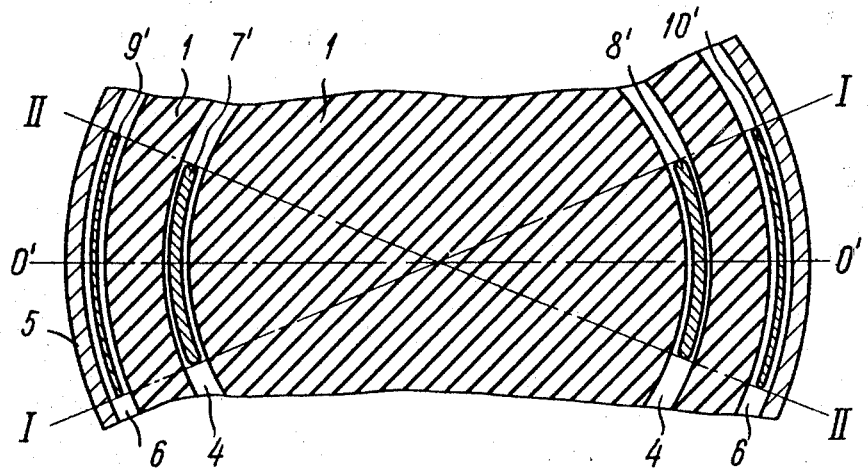
FIG. 4 is a section on line A¹—A¹ of FIG. 3.

| | Compression load, kg. | | | | | | | | | | | | | | |
|---|---|---|---|---|---|---|---|---|---|---|---|---|---|---|---|
| | 250 | | | 500 | | | 1,000 | | | 2,500 | | | 4,000 | | |
| Type of supports | $K_v$ | Along axis O—O | Perpendicular to axis O—O | $K_v$ | Along axis O—O | Perpendicular to axis O—O | $K_v$ | Along axis O—O | Perpendicular to axis O—O | $K_v$ | Along axis O—O | Perpendicular to axis O—O | $K_v$ | Along axis O—O | Perpendicular to axis O—O |
| Support without gap block | 500 | 190 | 190 | 520 | 200 | 200 | 530 | 240 | 240 | 1,800 | 730 | 730 | 2,400 | 1,140 | 1,140 |
| Support with detachable gap block, as in Figs. 1 and 2 | 600 | 190 | 190 | 700 | 300 | 230 | 750 | 450 | 340 | 1,900 | 1,000 | 950 | 3,080 | 1,200 | 1,200 |
| Support with detachable gap block, as in Figs. 3 and 4 | 500 | 280 | 250 | 630 | 415 | 350 | 750 | 530 | 390 | 1,700 | 1,280 | 930 | 3,500 | 1,600 | 1,250 |

$K_v$ denotes vertical stiffness of the support, kg./mm.
$K_g$ denotes horizontal stiffness of the support, kg./mm.

What we claim is:
1. An elastic vibration-proof, shock-absorbing support, comprising: a base; a cover with a side wall disposed above said base; a shock-absorbing member constituted of an elastic material arranged between said base and said cover and having at least one groove therein; said shock-absorbing member and the side wall of the cover being in spaced relation to form a gap therebetween, said groove and said gap being at least partially closed when the support is acted on by a compression load; and a gap block independent of said base and removably inserted into at least one of said groove and gap, said gap block being constituted of a material with a hardness greater than that of the material of said shock-absorbing member to alter the stiffness of the support as desired.

2. A support as claimed in claim 1 wherein said gap block extends only through a portion of the corresponding one groove or gap.

3. A support as claimed in claim 1 wherein said gap block comprises a plurality of plates engaged in said groove and gap.

4. A support as claimed in claim 3 wherein said shock-absorbing member and cover are of annular shape and said gap and groove are also of annular shape, said plates being curved and extending along part of the length of the respective groove and gap.

5. A support as claimed in claim 3 wherein said plates are diametrically opposed in said gap and groove and have lengths such that the ends of the plates in the gap and groove lie along common lines.

6. A support as claimed in claim 1 in which said gap block comprises a plate including at least one lug of such shape to fit into the corresponding groove or gap.

7. A support as claimed in claim 6 wherein said gap block includes a plurality of lugs at least one being in each groove and gap.

References Cited

UNITED STATES PATENTS 3,105,697    10/1963    Weaver et al. _____ 248—22 XR

RAY D. FRAZIER, Primary Examiner

J. FRANKLIN FOSS, Assistant Examiner

U.S. Cl. X.R.

248—24; 267—1